(12) United States Patent
Zuhlsdorf

(10) Patent No.: US 7,309,081 B1
(45) Date of Patent: Dec. 18, 2007

(54) FOUR WHEEL OFF-ROAD VEHICLE

(76) Inventor: David A. Zuhlsdorf, P.O. Box 2185, Wickenburg, AZ (US) 85358

( * ) Notice: Subject to any disclaimer, the term of this patent is extended or adjusted under 35 U.S.C. 154(b) by 383 days.

(21) Appl. No.: 11/156,968

(22) Filed: Jun. 20, 2005

(51) Int. Cl.
*B62D 21/00* (2006.01)

(52) U.S. Cl. ................................. 280/781; 280/6.154

(58) Field of Classification Search ................ 180/311, 180/312, 210, 213; 280/6.154, 781, 47.11, 280/47, 131
See application file for complete search history.

(56) References Cited

U.S. PATENT DOCUMENTS

| 2,792,234 | A | * | 5/1957 | Page ........................... 280/400 |
|---|---|---|---|---|
| 3,580,348 | A | | 5/1971 | Di Blasi |
| 3,583,727 | A | | 6/1971 | Wallis |
| 3,776,353 | A | | 12/1973 | Roth |
| 3,931,989 | A | | 1/1976 | Nagamitsu |
| 3,938,609 | A | | 2/1976 | Kensaku et al. |
| 3,995,875 | A | | 12/1976 | Wada |
| D246,776 | S | | 12/1977 | Moore |
| 4,159,752 | A | | 7/1979 | Kanno |
| 4,182,521 | A | | 1/1980 | Durand et al. |
| 4,372,416 | A | | 2/1983 | Igarashi |
| 4,496,019 | A | | 1/1985 | Tanaka |
| 4,596,301 | A | | 6/1986 | Nagashima |
| 5,312,121 | A | * | 5/1994 | Chapman .................. 280/47.11 |
| D348,030 | S | | 6/1994 | Heathcote |
| 2002/0125709 | A1 | * | 9/2002 | Wu ............................ 280/771 |

FOREIGN PATENT DOCUMENTS

CH 1267612 A 9/2000
WO WO 02/088573 A2 11/2002

* cited by examiner

*Primary Examiner*—Paul N. Dickson
*Assistant Examiner*—Tiffany L. Webb
(74) *Attorney, Agent, or Firm*—Frank J. McGue

(57) ABSTRACT

An off road vehicle comprises a front frame joined to a rear frame by a swivel rotates about a longitudinal axis. Springs are mounted to a horizontal planar structure and to the rear frame. The springs maintain the front frame to rear frame alignment but allows rotation between the front frame and the rear frame. A steering column extends upwardly and forwardly from a front axle having two wheels mounted laterally therefrom. The is connected to the two front wheels to turn in a desired direction. Front springs connect the axle to the steering column. A pair of shock absorbers connect the axle proximate to the wheels and the steering column. The pair of front springs and the pair of shock absorbers, in combination, maintain the front frame alignment to the axle but allow rotation between the front frame and the axle.

12 Claims, 6 Drawing Sheets

FOUR WHEEL OFF-ROAD VEHICLE

TECHNICAL FIELD

The present invention relates to four wheel off-road vehicles, and, more particularly, to an off road vehicle having a front and rear frame which are rotatably connected.

BACKGROUND OF THE INVENTION

Four wheel off road vehicles are well known in the art. However, stability of those vehicles in rough terrain is always an issue. There have been a number of attempts to increase the stability of such vehicles.

For example, U.S. Pat. No. 4,372,416 entitled "Tricycle Vehicle" issued on Feb. 8, 1983 to Igarashi discloses an off road or all terrain vehicle which comprises a tricycle vehicle having a forward wheel, two rear drive wheels, an engine driving said wheels and a seat. All elements are mounted to a body as well as a foot rest that protrudes from each side of the body and a seat that extends forwardly of the foot rests while the crankcase of the engine is disposed rearwardly of the foot rests.

U.S. Pat. No. 3,938,609 entitled "Tricycle" which issued on Feb. 17, 1976 to Kensaku et al. provides a tricycle with a pivoting frame which comprises a front and a rear frame swingingly connected with each other and which include an elastic member serving to restore the front frame when it is leaned against the rear frame.

U.S. Pat. No. 3,776,353 entitled "Three Wheeled Motor Vehicle" which issued on Dec. 4, 1973 to Roth shows a motorized three wheeled type vehicle which includes two relatively widely spaced power driven rear wheels and a centered single forward steering wheel and which includes a driver's seat at the driver's legs with the forwardly projecting portion of the frame extending upwardly toward its forward end to connect pivotally to a fork mounting the front wheel.

U.S. Pat. No. 3,583,727 entitled "Tricycle Vehicles" which issued on Jun. 8, 1971 to Wallis et al. has a motorized tricycle vehicle which includes a single steerable front wheel and a pair of rear wheels on a common transverse axis with an articulated frame so that the rider can lean to on side or the other when riding a bicycle.

None of the references, either singly or in combination, suggest or disclose the present invention.

SUMMARY OF THE INVENTION

It is an object of this invention to provide a front floor swivel which allows rotation about a longitudinal axis corresponding to the floor for stability in turns.

It is a further object of this invention to provide springs maintain the front to back alignment until a turn is initiated.

It is still another object of this invention to provide a front swivel which allows rotation about an axis parallel to the front wheel axle for bumps and to allow the front suspension to flex properly.

It is another object of this invention to include a front suspension and a rear suspension with extra support arms in front giving the rugged terrain the vehicle is designed to handle and to have large off road wheels with two disk brakes on the rear wheels.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which.

DESCRIPTION OF THE PREFERRED EMBODIMENT

Figure 1:
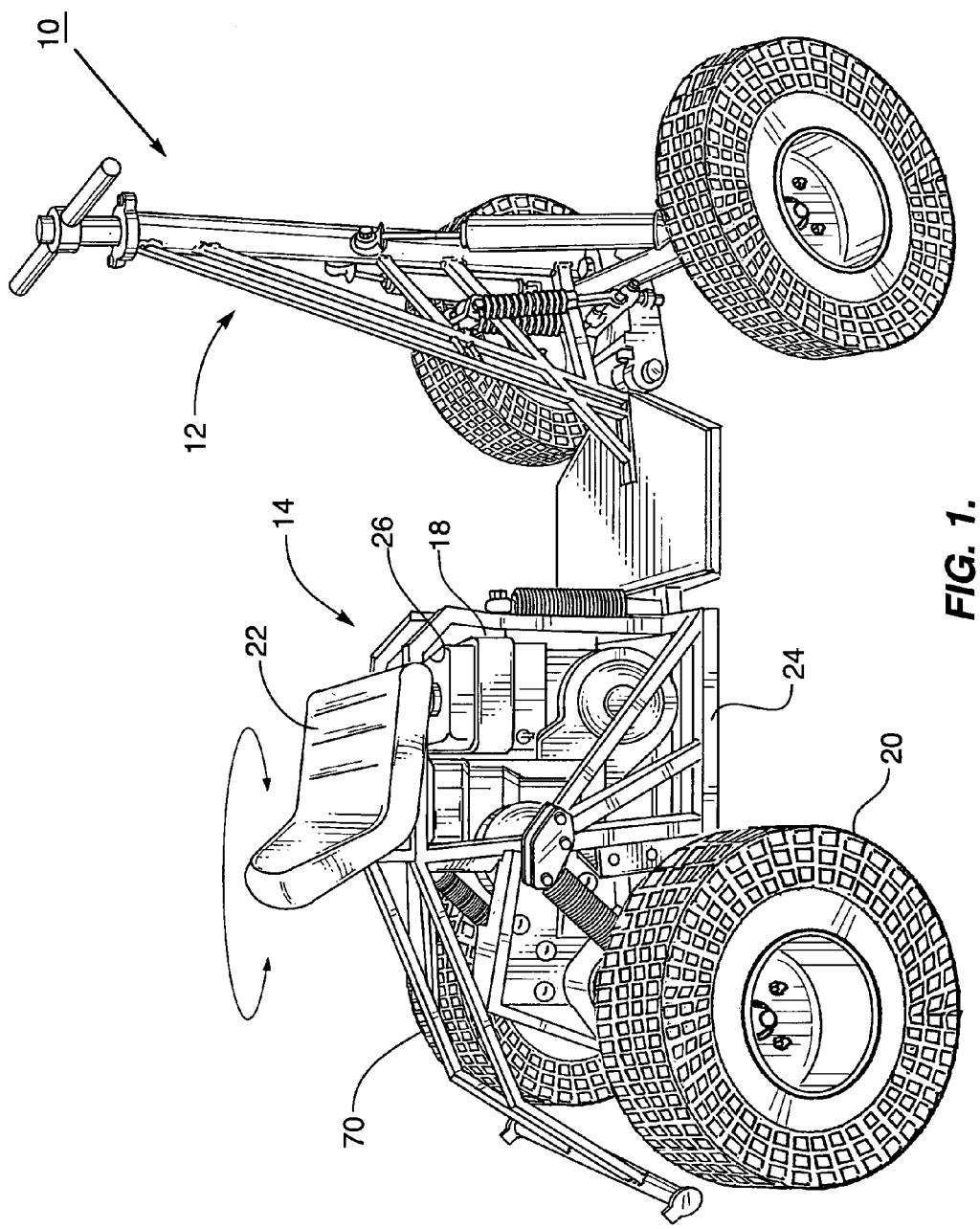
FIG. 1 is a perspective side view of the present invention.
Figure 2:
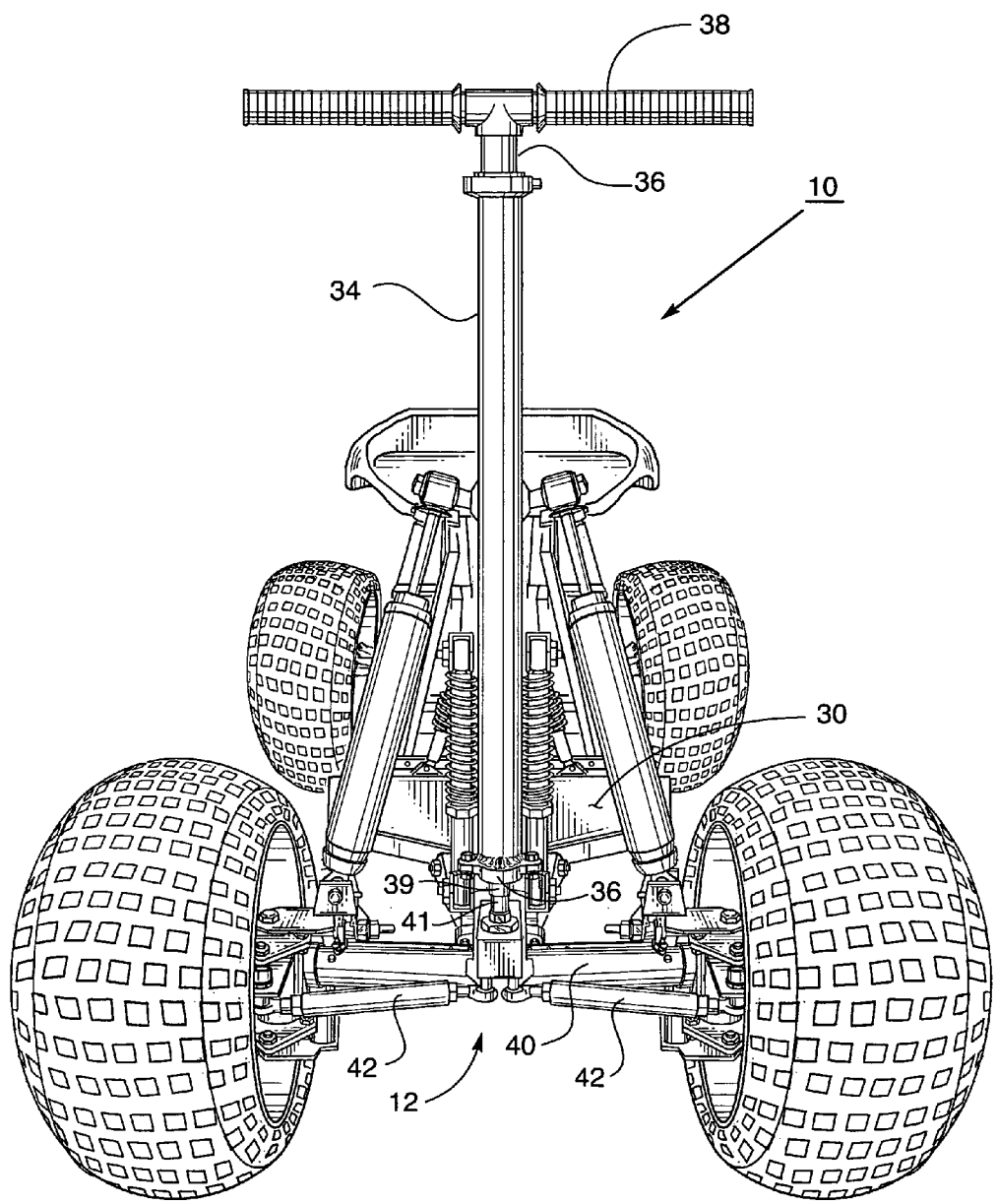
FIG. 2 is a perspective front view of FIG. 1.

Referring more particularly to the drawings by characters of reference, FIGS. 1-6 disclose a four wheel off road vehicle 10. Vehicle 10 comprises a front frame 12 joined to a rear frame 14 by a swivel 16. Mounted on rear frame 14 is an engine 18 which drives two rear wheels 20. Engine 18 can be any compatible engine of any desired horsepower. The present invention is preferably designed for sand so wheels 20 are preferably large off road style wheels. A seat 22 is provided for the user to ride.

In the illustrated embodiment, rear frame 14 comprises a plurality of sections of square tubing 24 defining a space 26 which encloses engine 18 and its associated components. Those skilled in the art will recognize that the invention is not limited to the specific configuration of tubing 24, or the use of tubing itself. While the depicted open frame is preferred for weight and ease of maintenance, an enclosed frame is certainly within the scope of the invention. Further, those skilled in the art will recognize that engine 18 can be connected to wheels 20 by a variety of mechanisms, including torque converters, chain drives, differentials and the like and that the present invention is not limited to any specific drive mechanism.

Figure 5:
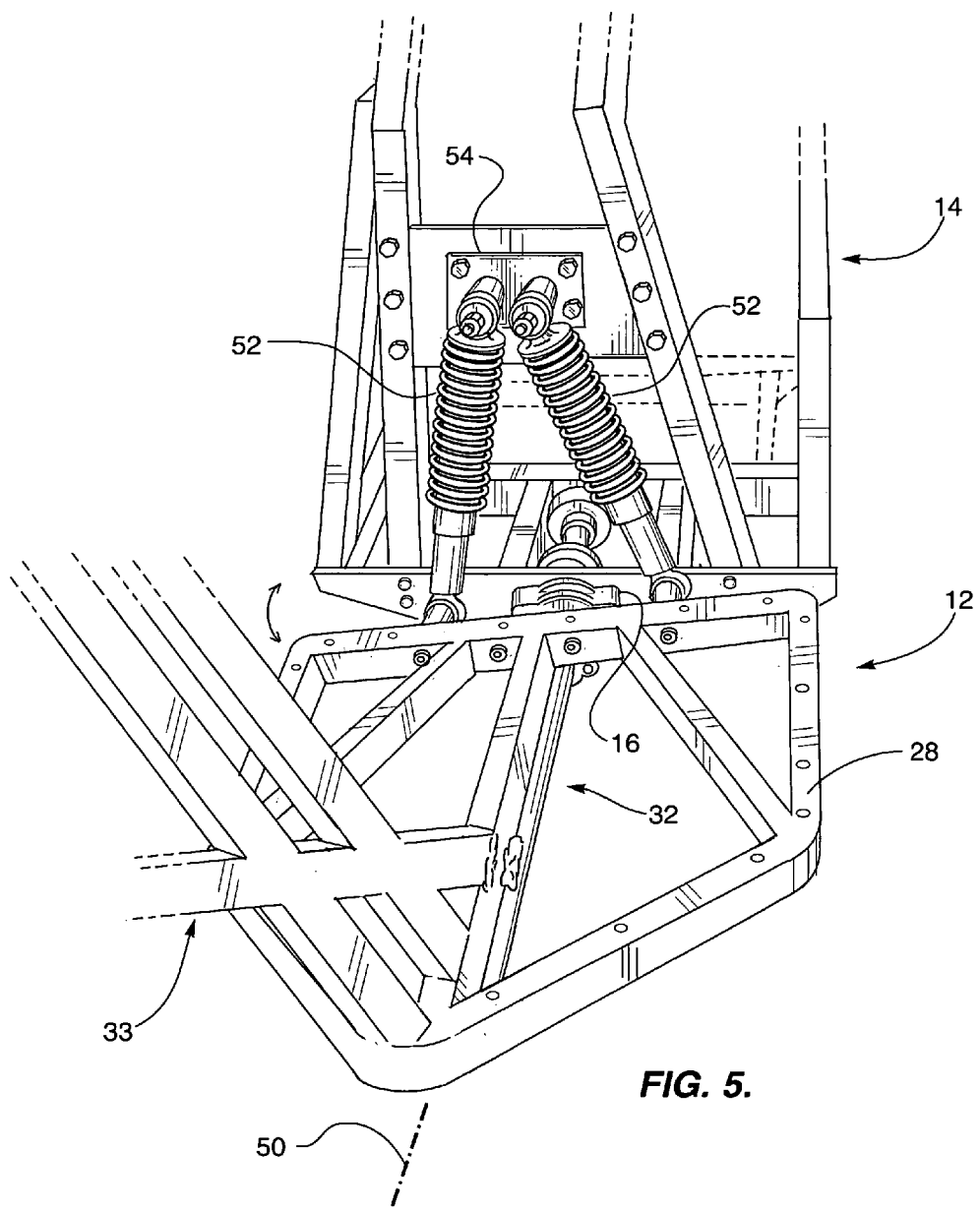
FIG. 5 is a close up front perspective view of a front swivel employed in the present invention.
Figure 6:
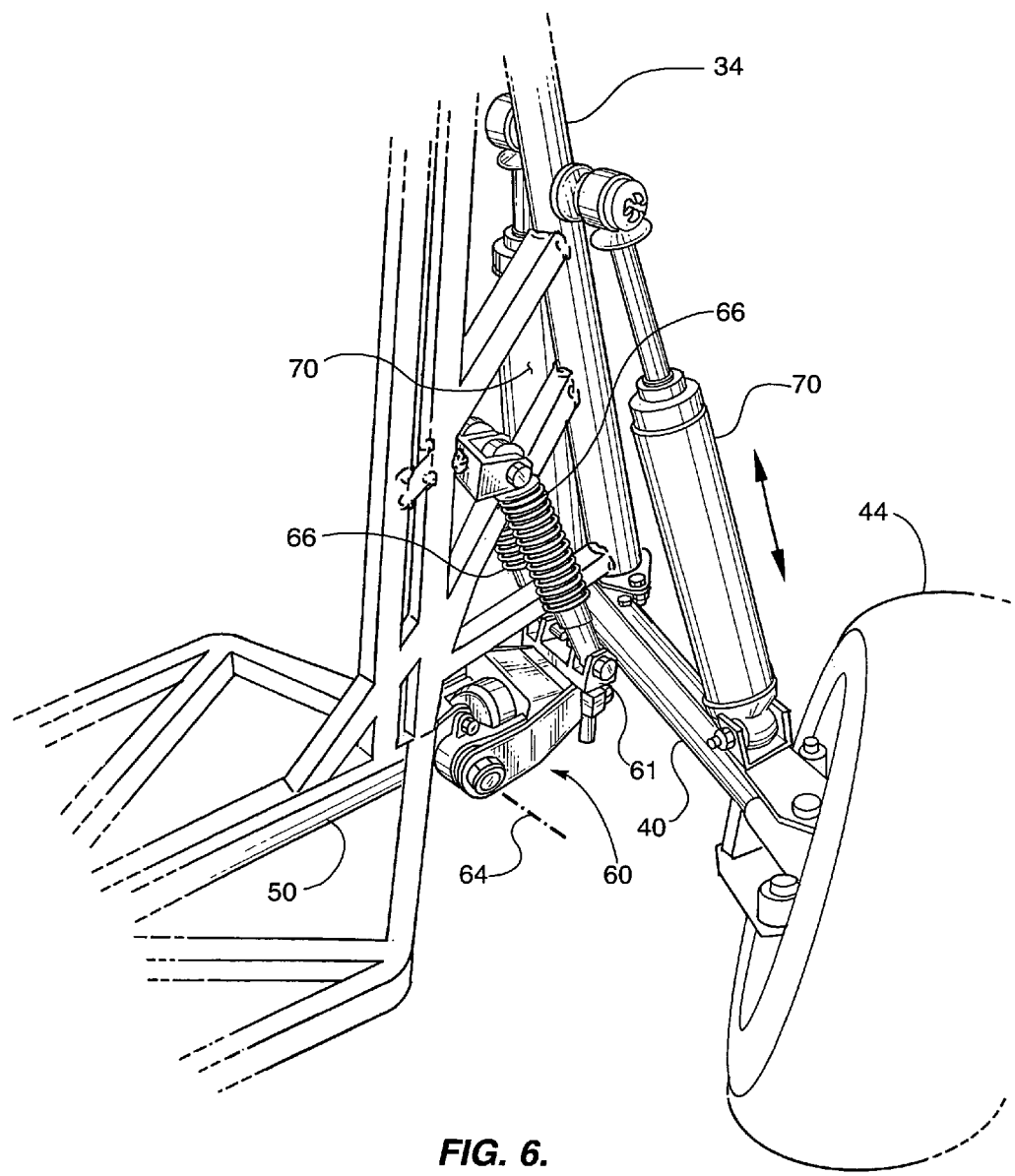
FIG. 6 is a perspective view of the front suspension of the present invention.

Front frame 12 comprises a plurality of square tubes 28, best seen in FIG. 5, welded to form a horizontal planar structure 32 extending forwardly from swivel 16. A foot plate 30 covers planar structure 32 to allow a rider's feet to rest thereon or to stand up on. A second plurality of square tubes 33 extends upwardly and forwardly from planar structure 32 to support a generally vertical steering column 34. Steering column 34 is hollow and a steering rod 36 extends therethrough.

A handlebar 38 is mounted to the top of steering rod 36 for the rider to steer the vehicle 10. Steering rod 36 connects to a pair of tubes 39 and 41 which are telescopically received within steering rod 36. Tube 41, in turn, is connected to rods 42 and an axle 40 having front wheels 44 mounted thereon in a conventional manner whereby turning handlebar 38 acts to turn front wheels 44 to move vehicle 10 in a desired direction. However, telescopically received tubes 39 and 41 in combination with steering rod 36 allow front wheels 44, rods 42 and axle 40 to move vertically with respect to front frame 12.

A front swivel assembly 60 extends forwardly from horizontal planar structure 32 to connect to axle 40 via a mount 61. A front swivel 62 allows rotation about a lateral axis 64 at right angles to longitudinal axis 50 and extending horizontally therefrom. A pair of front springs 66 extend upwardly and rearwardly from mount 61 to connect to the second plurality of tubes 33 to maintain the front frame 12 to axle 40 alignment until a turn is initiated or a bump encountered. Once either event occurs, axle 40 moves upwardly and downwardly with respect to front frame 12 rotate about lateral axis 64 which provides added stability.

Figure 3:
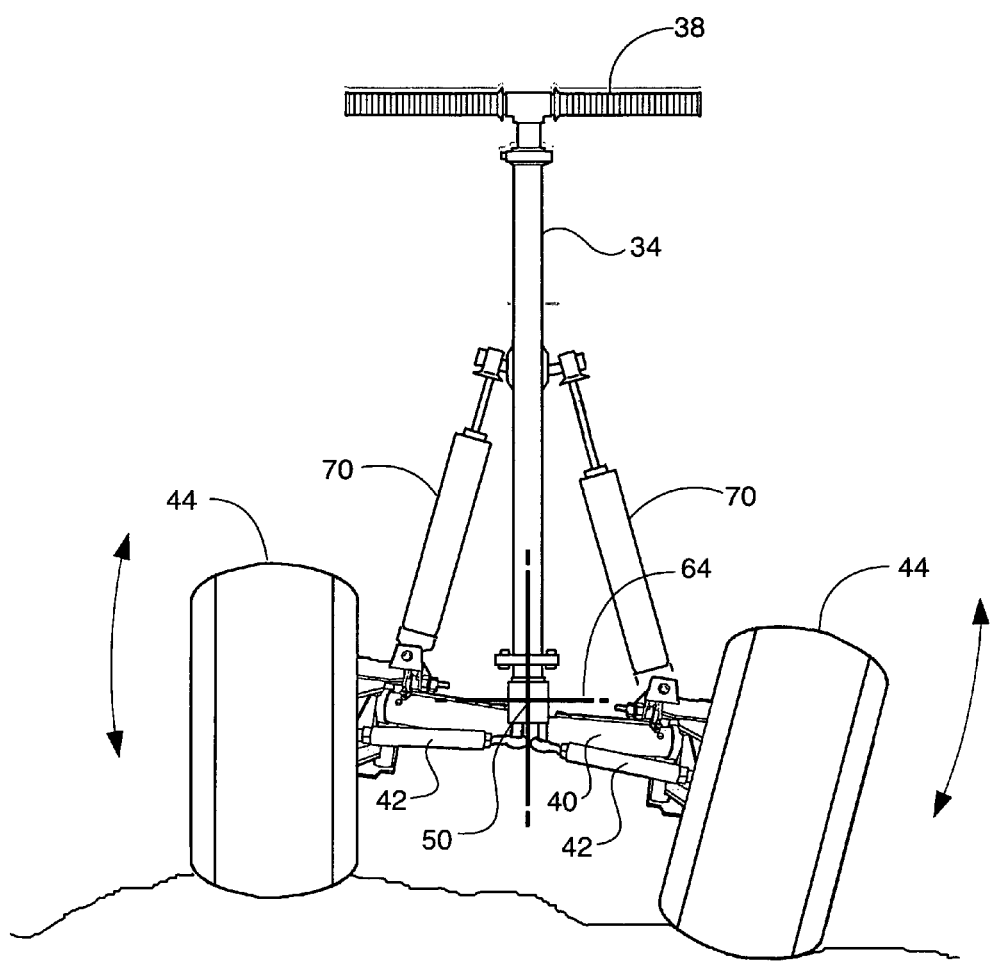
FIG. 3 is a front partial view showing the front suspension of the present invention.
Figure 4:
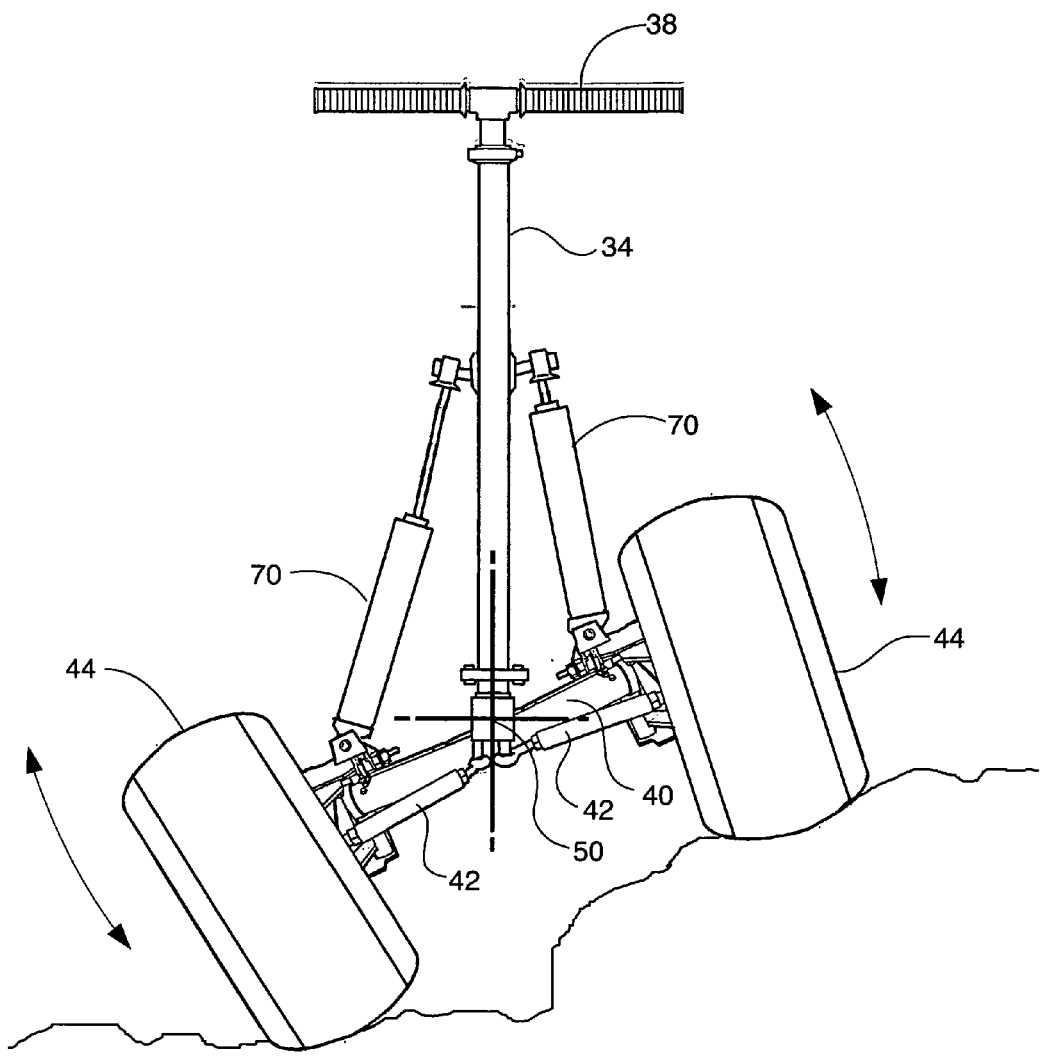
FIG. 4 is a front partial view showing the front suspension of the present invention in a flexed position.

A pair of shock absorbers 70 are mounted to steering column 34 and extend downwardly and laterally therefrom to connect to axle 40 proximate to front wheels 44. As best seen in FIGS. 3 and 4, as wheels 44 encounter differing terrain, axle 40 rotates about axis 50. Shock absorbers 70 maintain the front frame 12 to axle 40 alignment until a turn is initiated or bumps in the road encountered. Once the bumps are encountered or the turn initiated, as shown in FIGS. 3 and 4, front frame 12 and axle 40 rotate about axis 50 which provides added stability in that turn.

As best seen in FIG. 5, swivel 12 allows rotation about a longitudinal axis 50 which connects the centers of the two axles of rear wheels 20 and front wheels 44. Each of a pair of springs 52 are mounted to horizontal planar structure 32, one on each side of swivel 12 and extending upwardly therefrom. The other end of each of the pair of springs 52 are connected to rear frame 14 via a mounting plate 54. Springs 52 maintain the front frame 12 to rear frame 14 alignment until a turn is initiated. Once a turn in initiated, as shown in FIG. 5, rear frame 14 and front frame 12 rotate about axis 50 which provides added stability in that turn.

Although only certain embodiments have been illustrated and described, it will be apparent to those skilled in the art that various changes and modifications may be made therein without departing from the spirit of the invention or from the scope of the appended claims.

What is claimed is:

1. An off road vehicle comprising a front frame joined to a rear frame by a swivel, the rear frame defining a space having a motor mounted within the space, the motor operatively connected to two rear wheels mounted to the rear frame, the front frame having a horizontal planar surface extending forwardly from the swivel, the swivel allowing rotation about a longitudinal axis, a pair of springs being mounted to the horizontal planar structure on each side of the swivel and extending upwardly therefrom to connect to the rear frame, the pair of springs maintaining the front frame to rear frame alignment but allowing rotation between the front frame and the rear frame as needed when encountering uneven terrain or in turning, a front swivel assembly extending forwardly from the horizontal planar structure to connect to an axle having two front wheels extending laterally therefrom, the front swivel rotating about a lateral axis at right angles to the longitudinal axis and extending horizontally therefrom, the axle rotating about the longitudinal axis, a steering column extending upwardly and forwardly from the axle, the steering column being operatively connected to the two front wheels, the steering column being manipulated to turn the two front wheels in a desired direction, a pair of front springs extending upwardly and rearwardly from the front swivel proximate to the axle to connect to the steering column, a pair of shock absorbers extend downwardly and laterally from the steering column to the axle proximate to each of the front wheels, the pair of front springs and the pair of shock absorbers, in combination, maintaining the front frame alignment to the axle but allowing rotation between the front frame and the axle as needed when encountering uneven terrain or in turning.

2. The off road vehicle of claim 1 wherein the engine is an internal combustion engine.

3. The off road vehicle of claim 1 wherein the rear wheels and the front wheels are large off road style wheels.

4. The off road vehicle of claim 1 having a seat mounted on top of the rear frame.

5. The off road vehicle of claim 1 wherein the front frame and the rear frame comprise a first plurality of sections of tubing.

6. The off road vehicle of claim 5 wherein the tubing is square tubing.

7. The off road vehicle of claim 5 wherein the steering column is supported by a second plurality of sections of tubing extending upwardly and forwardly from the horizontal planar structure.

8. The off road vehicle of claim 1 having a foot plate covering the horizontal planar structure.

9. The off road vehicle of claim 1 wherein the steering column is hollow and a steering rod extends therethrough.

10. The off road vehicle of claim 9 further comprising a handlebar mounted to the top of the steering rod, the steering rod connecting to one or more telescoping tubes received within the steering rod, the one or more tubes operatively connected to two rods and the axle, the tubes allowing the steering column to move vertically with respect to the axle when encountering uneven terrain or in a turn.

11. An off road vehicle comprising a front frame joined to a rear frame by a swivel, the front frame and the rear frame comprising a plurality of sections of square tubing, the rear frame defining a space having an engine mounted within the space, the engine operatively connected to two rear wheels mounted to the rear frame, a seat mounted on top of the rear frame, the front frame having a horizontal planar surface extending forwardly from the swivel, a foot plate covering the horizontal planar structure, the swivel allowing rotation about a longitudinal axis, a pair of springs being mounted to the horizontal planar structure on each side of the swivel and extending upwardly therefrom to connect to the rear frame, the pair of springs maintaining the front frame to rear frame alignment but allowing rotation between the front frame and the rear frame as needed when encountering uneven terrain or in turning, a front swivel assembly extending forwardly from the horizontal planar structure to connect to an axle having two front wheels extending laterally therefrom, the front swivel rotating about a lateral axis at right angles to the longitudinal axis and extending horizontally therefrom, the axle rotating about the longitudinal axis, a steering column extending upwardly and forwardly from the axle, the steering column being operatively connected to the two front wheels, the steering column being manipulated to turn the two front wheels in a desired direction, a second plurality of tubing extending upwardly and forwardly from the horizontal planar structure to support the steering column, the steering column being hollow with a a steering rod extending therethrough, a handlebar mounted to the top of the steering rod, the steering rod connecting to one or more telescoping tubes received within the steering rod, the one or more tubes operatively connected to two rods and the axle, the tubes allowing the steering column to move vertically with respect to the axle when encountering uneven terrain or in a turn, a pair of front springs extending upwardly and rearwardly from the front swivel proximate to the axle to connect to the steering column, a pair of shock absorbers extend downwardly and laterally from the steering column to the axle proximate to each of the front wheels, the pair of front springs and the pair of shock absorbers, in combination, maintaining the front frame alignment to the axle but allowing rotation between the front frame and the axle as needed when encountering uneven terrain or in turning.

12. The off road vehicle of claim 11 wherein the rear wheels and the front wheels are large off road style wheels.

* * * * *